United States Patent Office 3,206,493
Patented Sept. 14, 1965

3,206,493
PREPARATION OF O,O,S-TRIESTERS OF MONOTHIOPHOSPHORIC ACID
Fred K. Kawahara, Park Forest, Ill., and Russell H. Brown, Munster, Ind., assignors to Standard Oil Company, Chicago, Ill., a corporation of Indiana
No Drawing. Filed Aug. 21, 1961, Ser. No. 132,563
6 Claims. (Cl. 260—461)

This invention relates to the preparation of O,O-diesters of monothiophosphoric acid and also relates to the esterification of said acid and the use of certain O,O,S-triesters of monothiophosphoric acid as novel motor fuel additives.

A new route to the preparation of triesters of monothiophosphoric acid has been discovered. In general, the new preparation comprises reacting $P_2S_5$ with an alcohol or a phenol compound to form a diester of dithiophosphoric acid, the controlled reaction of the diester of dithiophosphoric acid with water to replace one sulfur atom with oxygen to form a diester of monothiophosphoric acid and thereafter reacting the diester of monothiophosphoric acid with a monoolefin to form mainly O,O,S-triester of monothiophosphoric acid. The reactions involved are as follows:

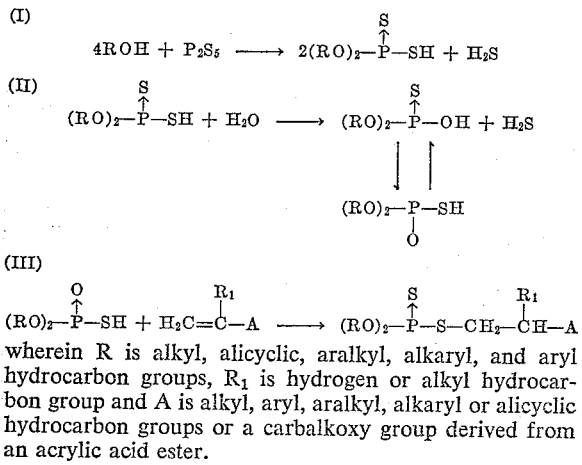

wherein R is alkyl, alicyclic, aralkyl, alkaryl, and aryl hydrocarbon groups, $R_1$ is hydrogen or alkyl hydrocarbon group and A is alkyl, aryl, aralkyl, alkaryl or alicyclic hydrocarbon groups or a carbalkoxy group derived from an acrylic acid ester.

In reaction (II), the removal of one sulfur atom and the replacement thereof with one oxygen atom is accomplished with substantially equal moles of water and O,O-diester of dithiophosphoric acid at a temperature above 100° F. suitable in the range of 150 to 250° F. and preferably 180 to 240° F. Actually reaction (II) is shown in simplified form for there are a number of by-products formed containing P, O, and S. More completely shown, the reaction of diester of dithiophosphoric acid with one mole of water results in the following:

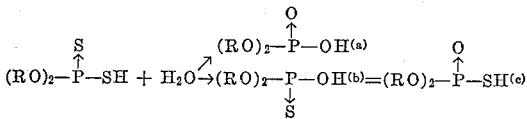

The formation of product (a) is minor, not more than about 15% of the reaction product and generally in the range of about 8 to 10% by weight. As indicated, product (c) is in equilibrium with product (b). The O,O-diester of monothiophosphoric acid (b) does not react readily with a compound containing ethylenic unsaturated such as styrene or the esters of the acrylic acids to form a triester. However, the O,O-diester of monothiophosphoric acid (c) will react quite readily with compounds containing ethylenic unsaturation to form O,O,S-triesters of monothiophosphoric acid. It has been discovered that the reaction mixture resulting from the controlled reaction of diesters of dithiophosphoric acid with one mole of water can be reacted with a compound containing ethylenic unsaturation to form O,O,S-triesters of monothiophosphoric acid in substantial yields. Apparently as the ethylenically unsaturated compound reacts with O,O-diester of monothiophosphoric acid, additional O,O-diester of monothiophosphoric acid forms which then reacts with the ethylenically unsaturated reactant. The net result is that the mixture obtained from the controlled reaction with one mole of water is converted by reaction with the ethylenically unsaturated reactant to a mixture of phosphorus-containing compounds comprising 60 to 80% by weight of O,O,S-triester of monothiophosphoric acid with the remainder of the phosphorus-containing compounds comprising 20 to 40% by weight and comprising mainly unesterified diester of phosphoric acid with some unreacted diester of monothio and/or monothionophosphoric acids.

With respect to the conditions of the controlled reaction between O,O-diesters of dithiophosphoric acid and water, as hereinbefore indicated, substantially equimolecular proportions of each are employed. Suitably the quantity of water is in the range of 0.8 to 1.2 moles per mole of O,O-diester of dithiophosphoric acid but preferably equal mole for mole of O,O-diester of dithiophosphoric acid. The replacement of one sulfur atom with one oxygen atom, is as hereinbefore disclosed, suitably carried out at temperatures above 100° F. At temperatures below about 150° F., the reaction between water and O,O-diester of dithiophosphoric acid is too slow to be commercially useful. Reaction temperatures of above about 250° F. will result in too vigorous reaction with water causing a portion of the sulfur atoms to also be replaced by oxygen thereby resulting in the formation of O,O-diester of phosphoric acid which is not at all readily reactive with ethylenically unsaturated compound. Thus the too vigorous reaction conditions are to be avoided for the purposes of this invention which includes the preparation and use of the O,O,S-triesters of monothiophosphoric acids. The unique efficient preparation of O,O-diesters of phosphoric acid by reaction of O,O-diesters of dithiophosphoric acid with two or more moles of water is the subject of a copending application.

The O,O-diesters of dithiophosphoric acid which can be employed in the reaction with water according to this invention are those, as hereinbefore disclosed, having the formula

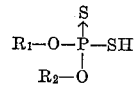

wherein $R_1$ and $R_2$ are alkyl, alicyclic, aralkyl, aryl, alkaryl hydrocarbon groups. Such O,O-diesters of dithiophosphoric acid are well known and can readily be prepared by the reaction of an alkyl, alicyclic or aralkyl alcohol or a phenolic compound, i.e. an aromatic or alkyl substituted aromatic containing a hydroxy group on the aromatic ring such as phenol, the cresols and ethyl, propyl, butyl, etc., alkyl substituted phenols, naphthols, alkyl substituted naphthols, hydroxy biphenyls and the like with phosphorus pentasulfide. Generally, four moles of the hydroxy reactant (alcohol or phenol) are reacted with each mole of phosphorus pentasulfide in which case $R_1$ and $R_2$ are the same hydrocarbon group. Accordingly, there can be used in the process of this invention hereinbefore illustrated by reaction equation (II) such O,O-diesters as illustrated by, but not limited to O,O-dimethyl; O,O-diethyl; O,O-diisopropyl; O,O-di-n-propyl; O,O-di-n-butyl; O,O-diisobutyl; O,O-di-sec-butyl; O,O-di-tert-butyl; O,O-di-n-amyl; O,O-di-isoamyl; O,O-di-(2-ethylpropyl); O,O-di-sec-amyl; O,O-di-(1-ethylpropyl); O,O-di-(11)- dimethylpropyl; O,O-di-hexyl; O,O-di-(2-ethylhexyl); O,O-di-decyl; O,O-di-dodecyl; O,O-di-octadecyl; O,O-di-cyclohexyl; O,O-di-cyclopropyl; O,O-di-cyclopentyl; O,O-di-(methylcyclohexyl); O,O-di-phenyl; O,O-di-(o, m, and p-tolyl); O,O-di-xylyl; O,O-di-(isopropylphenyl); O,O-di-(ethylphenyl); O,O-di-(tertiary-butylphenyl); O,O-di-benzyl; O,O-di-(phenethyl); O,O-di-(p-methylbenzyl); O,O-di-(naphthyl); O,O-di-(beta-methylnaphthyl), and the like dithiophosphoric acids. It is preferred that the alkyl groups contain not more than 12 carbon atoms since alkyl groups of greater carbon content tend to result in ester products of undesirable nature in the O,O,S-triester products, they tend to be gum formers in the engine when used as fuel additives.

The ethylenic unsaturated reactants which can be used in the preparation of the O,O,S-triesters of monothiophosphoric acid include, for example, ethylene, propylene, 1-butene, isobutylene, 1-pentene, 2-pentene, 1-hexene, 1-heptene, 1-octene, 1-nonene, 1-decene, cyclohexene, methylcyclopentene, propylene trimer, proylene trimer, propylene tetramer, butylene dimer, etc., olefinic hydrocarbons of 2 to 40 carbon atoms, desirably 2 to 20 carbon atoms per molecule as well as styrene, alphamethylstyrene, and other aryl substituted ethylenes, methylacrylate, ethylacrylate, propylacrylate, isopropylacrylate, methylmethacrylate, ethylmethacrylate, propylmethacrylate, methylethacrylate, ethylethacrylate, isopropylethacrylate, and the like.

The reaction between the ethylenic unsaturated reactant and the mixture resulting from the replacement of one sulfur of O,O-diester of dithiophosphoric acid with one oxygen is carried out at a temperature above 200° F., desirably at a temperature in the range of 200 to 300° F. and preferably in the range of 220 to 265° F.

An embodiment of this invention also includes the first step preparation of the O,O-diesters of dithiophosphoric acid, also known as O,O-dihydrocarbon dithiophosphoric acids. According to this embodiment, the corresponding hydroxy hydrocarbon, alcohol or phenolic compound, is reacted with phosphorus pentasulfide in the ratio of four moles of hydroxy hydrocarbon per mole of $P_2S_5$ at temperatures of from 100 to 400° F. Useable hydroxy hydrocarbons are evident from the foregoing examples of O,O-diesters of dithiophosphoric acid. For example, the hydroxy hydrocarbons of the hydrocarbon radicals disclosed as O-substituted in the dithiophosphoric acids, such as methanol, isopropanol, phenol, cresol, naphthol, cyclohexanol, benzyl alcohol and the like. Thereafter, the O,O-dihydrocarbon dithiophosphoric acid is reacted, without recovery from the reaction mixture in which it was produced, with equimolecular proportions of water. When the O,O-dihydrocarbon dithiophosphoric acid is insoluble in water, the reaction with one mole of water is carried out in the presence of a solvent, preferably the hydroxy compound reacted with $P_2S_5$ or an alcohol in which both the O,O-dihydrocarbon dithiophosphoric acid and water are soluble. In general, isopropanol is a suitable solvent. To the mixture resulting from the reaction with water is added the ethylenically unsaturated reactant to convert the O,O-dihydrocarbon monothiophosphoric acid to the corresponding O,O,S-triester. Acidic impurities are removed from the reaction mixture by an aqueous alkaline wash. As will be appreciated, a strongly alkaline aqueous wash will tend to promote hydrolysis of the ester group of the acrylic acid residue. A suitable aqueous alkaline wash can be carried out with 5 to 10% sodium bicarbonate solution or one of comparable pH. Aqueous solutions of sodium hydroxide or potassium hydroxide can be suitably used when the S-ester group is hydrocarbon as is the case when the O,O-diester of monothiophosphoric acid is reacted with an olefin or a styrene. After drying the washed product containing the O,O,S-triester of monothiophosphoric acid, the reaction solvents and excess ethylenically unsaturated reactant are removed, preferably at reduced pressure, by evaporation or distillation. Since there will be also present unesterifield phosphoric acids, O,O-dihydrocarbon phosphoric acids, amounting to about 20 to 30% of the crude triester product, they need not be removed. Rather, the crude ester product can be neutralized with an olefin oxide, suitably one containing 4 to 10 carbon atoms and preferably butylene oxide and the olefin oxide neutralized product used as a preignition suppressing additive for motor fuel at mole ratios of phosphorus to lead in the range of 0.1 to 1.0.

The following specific examples illustrate the process of this invention and typical products resulting therefrom and are not intended to be limiting with respect to the applicability of the process or the products which will result therefrom.

EXAMPLE 1

*Preparation of O,O-diisopropyl S-phenylethyl monothiophosphate*

Isopropanol 144 grams (2.4 moles) is charged to a three-neck flask fitted with a stirrer, thermometer and condenser. The alcohol is heated with stirring to 140° F. and thereafter 111 grams (0.5 mole) $P_2S_5$ is added gradually. The final reaction temperature is about 170° F. Thereafter, the reaction mixture is heated for 60 minutes until a clear solution forms at 190° F. To the clear solution is added 17.5 grams (97 mole percent of theory) water in 20 grams isopropanol. The resulting mixture is heated for four hours to a maximum temperature of 230° F.

To a 118-gram portion of the foregoing reaction mixture, containing about 0.5 mole of O,O-diester of monothiophosphoric acid, there is added 62 grams (0.6 mole) styrene. This mixture is heated to 225° F. for 30 minutes and the acidity of a portion thereof is determined. The acidity is 85%. Further heating of the mixture at 240° F. for 7.5 additional hours reduced the acidity to 68%. The O,O-diisopropyl S-phenylethyl monothiophosphoric acid can be recovered by washing the reaction product (171 grams) with a 5% sodium bicarbonate aqueous solution to remove phosphoric acids until neutral to litmus and removing any remaining isopropanol and styrene under reduced pressure. Or the acidic reaction product (68% acidity) can be neutralized with an alkyl oxide such as butylene oxide and the resulting mixture, after removal of excess isopropanol and styrene, used as an additive for motor fuel. Such a butylene oxide neutralized mixture of O,O-diisopropyl S-phenylethylmonothiophosphate and O,O-diisopropylphosphoric and dithiophosphoric acids has an antiknock depressing characteristic in leaded gasoline of only 55% of O,O-diisopropyl-S-phenylethyl dithiophosphoric acid at the same mole ratio of phosphorus to lead.

EXAMPLE II

To 116-gram portion of the water reaction product prepared by the process described in Example I, there is added 60 grams (0.6 mole) ethyl acrylate. This mixture is heated to 220° F. for 30 minutes (acidity 57%) and then further heated at 235° F. for six additional hours. Final acidity 33%. There is produced 167 grams of reaction product which contains 8.78% P and 10.56% S with an acid number of 48.1 (mg KOH per gram of product). A 100-gram portion of the 167 gram product (acid No. 48.1) is washed with 5% sodium bicarbonate aqueous solution until neutral to litmus. Excess isopropanol and ethyl acrylate are removed at reduced pressure leaving a residue of 66.8 grams, a 71.5% yield. By analysis of this product, it is found to contain 9.42% P and 12.95% S, an acid number of 0.43, and one-third contains 2 sulfur atoms (O,O-diisopropyl S-beta carbethoxy ethyl dithiophosphate) and two-thirds contains one sulfur atom, O,O-diisopropyl S-carbethoxy ethyl monothiophosphate.

The 67 grams of reaction product of acid number 48.1 from the ethyl acrylate reaction is neutralized with butylene oxide and used as an additive for leaded gasoline. When compared with O,O-diisopropyl S-phenylethyl dithiophosphate at the same mole ratio of phosphorus to lead, it is found to have an antiknock depressing characteristic of 64% of the O,O-diisopropyl S-phenylethyl dithiophosphate.

EXAMPLE III

To 100 grams of di-p-tolyl dithiophosphoric acid obtained by the reaction of p-cresol and $P_2S_5$, there is added 5.3 grams of water in 15.5 grams of dioxane. This mixture is heated for 2.5 hours at 210° F. Analysis of the reaction product shows 8.65% P and 10.0% S.

To 53.3 grams of the above reaction product is added 36.5 grams of ethyl acrylate at 200 to 210° F. After one hour, the acidity is 37% and after two hours, the acidity is 20.6%. There is produced 83.0 grams of reaction product which on analysis shows 5.48% P and 5.88% S with an acid number of 24.7. The mixture contains:

| | Percent |
|---|---|
| O, O - di - p - tolyl-S-beta-carbethoxyethyl dithiophosphate | 27 |
| O,O - di - p - tolyl-S-beta-carbethoxyethyl monothio phosphate | 46 |
| O,O-di-p-tolyl-monothiophosphoric acid | 8 |
| O,O-di-p-tolyl phosphoric acid | 19 |

Washing of 60 grams of this product (acid number 24.7) is carried out with an aqueous solution of sodium hydroxide. The washed product is dried and solvents are removed at reduced pressure. There is recovered 35 grams of product, 73% yield on phosphorus used, which upon analysis shows 6.85% P and 9.27% S with an acid number of 0.58. This product (nearly acid-free) contains 65% O,O-di-p-tolyl-S-beta-carbethoxyethyl monothiophosphate and 35% O,O-di-p-tolyl-S-beta-carbethoxyethyl dithiophosphate.

Neutralization of foregoing mixture containing the phosphoric acids and O,O-di-p-tolyl-S-carbethoxyethyl monothiophosphate with butylene oxide will produce a preignition suppression additive for leaded motor fuel having an antiknock depressing characteristic of 50 to 65% of the antiknock depression value of the corresponding O,O-di-p-tolyl-S-phenylethyl dithiophosphate or comparable O,O-di-p-tolyl-S-hydrocarbon dithiophosphates at the same mol ratio of phosphorus to lead.

By using other of the O,O-dithiophosphoric acids hereinbefore disclosed in the process of this invention with any of the other ethylenically unsaturated reactants, there can be obtained products containing the corresponding O,O,S-triester of monothiophosphoric acid. These as well as the ester products hereinbefore disclosed can be used per se as preignition suppression additves for leaded motor fuels at a phosphorus to lead mole ratio in the range of 0.1 to 1.0, or the ester product can be neutralized with an olefin oxide, suitably containing 2 to 10 carbon atoms, preferably butylene oxide, to prepare preignition suppression additives for leaded motor fuel useful in the range of 0.1 to 1.0 mole ratio of phosphorus to lead.

What is claimed is:

1. A method for preparing a reaction product containing as the principal product an O,O,S-triester of monothiophosphoric acid which comprises reacting an O,O-dihydrocarbon substituted dithiophosphoric acid whose hydrocarbon substituents are selected from the class consisting of $C_1$ to $C_{18}$ saturated alkyl hydrocarbons, saturated cycloalkyl hydrocarbons, aryl hydrocarbons and alkyl substituted aryl hydrocarbons whose unsaturation is only in the aromatic ring with substantially equimolecular proportion of water temperature above 100° F. but not exceeding 250° F., thereby producing a reaction mixture containing an O,O-dihydrocarbon subtstituted monothiophosphoric acid whose hydrocarbon substituents correspond to the hydrocarbon substituents in said dithiophosphoric acid and thereafter reacting the mixture containing said O,O-dihydrocarbon monothiophosphoric acid with an excess of ethylenically unsaturated compound selected from the class consisting of mono-olefinic hydrocarbons and lower alkyl esters of an acrylic acid which esters in addition to the two oxygen atoms contain only atoms of hydrogen and carbon, thereby forming a mixture containing an O,O,S-triester of monothiophosphoric acid whose three ester groups consist of said two original O-hydrocarbon ester groups and the S-ester group is derived from reaction of the hydrogen of the SH group of said monothiophosphoric acid with said ethylenically unsaturated compound, washing said mixture containing the triester with an aqueous alkaline solution, drying said washed triester containing mixture and removing unreacted ethylenically unsaturated reactant under reduced pressure.

2. The process of claim 1 wherein the ethylenically unsaturated reactant is an acrylic acid ester.

3. The process of claim 1 wherein the ethylenically unsaturated reactant is ethyl acrylate.

4. The process of claim 1 wherein the ethylenically unsaturated reactant is styrene.

5. A method for preparing a reaction product containing as the principal product O,O-diisopropyl-S-carbethoxy ethyl monothiophosphate which comprises reacting O,O-di-isopropyl dithiophosphoric acid with substantially equimolecular proportion of water at a temperature in the range of 150 to 250° F. thereby producing a reaction mixture containing O,O-diisopropyl monothiophosphoric acid, reacting said mixture containing O,O-diisopropyl monothiophosphoric acid with an excess of ethyl acrylate thereby producing a triester mixture containing O,O-diisopropyl-S-carbethoxy ethyl monothiophosphate, washing said triester mixture with an aqueous solution of sodium bicarbonate, drying said washed triester mixture, removing unreacted ethyl acrylate under reduced pressure to recover a reaction product containing O,O-diisopropyl-S-carbethoxy ethyl monothiophosphate as the principal product.

6. A method for preparing a reaction product containing as the principal product O,O-di-p-tolyl-S-carbethoxy ethyl monothiophosphate which comprises reacting O,O-di-p-tolyl dithiophosphoric acid with equimolecular proportion of water at a temperature in the range of 150 to 250° F. thereby producing an acid mixture containing O,O-di-p-tolyl-monothiophosphoric acid, reacting said acid mixture with an excess of ethyl acrylate thereby producing a triester mixture containing O,O-di-p-tolyl-S-carbethoxy ethyl monothiophosphate, washing said triester product, removing the excess ethyl acrylate under reduced pressure to recover a reaction product containing O,O-di-p-tolyl-S-carbethoxy ethyl monothiophosphoric acid as the principal product.

References Cited by the Examiner

UNITED STATES PATENTS

| 2,802,856 | 8/57 | Norman et al. | 260—461 |
| 2,866,695 | 12/58 | Gilbert | 44—69 |
| 2,890,947 | 6/59 | Annable et al. | 44—19 |
| 2,961,457 | 11/60 | Pohlemann et al. | 260—461 |
| 2,976,308 | 3/61 | Bacon | 260—461 |
| 2,976,309 | 3/61 | Schrader | 260—461 |
| 3,047,459 | 7/62 | Perini et al. | 260—461 |
| 3,059,014 | 10/62 | Miller | 260—461 |
| 3,060,217 | 10/62 | Schrader | 260—461 |
| 3,065,256 | 11/62 | Schrader | 260—461 |
| 3,076,009 | 1/63 | Schrader | 260—461 |
| 3,113,005 | 12/63 | Gilbert | 260—461 |

OTHER REFERENCES

Kosolapoff: "Organo-Phosphorus Compounds," John Wiley & Sons (1950), pp. 236—237.

Melnikov et al.: "J. Gen. Chem. U.S.S.R. 23, 1417–1402(a) (1953) (English Trans.).

Pishchimuka: "Chem. Abst.," vol. 20, col. 2816 (1926).

CHARLES B. PARKER, *Primary Examiner.*

JULIUS GREENWALD, IRVING MARCUS, JOSEPH P. BRUST, *Examiners.*